US010946971B2

(12) United States Patent
John et al.

(10) Patent No.: US 10,946,971 B2
(45) Date of Patent: Mar. 16, 2021

(54) INFLATION CONTROL SYSTEM

(71) Applicant: GOODRICH CORPORATION, Charlotte, NC (US)

(72) Inventors: Poly Puthur John, Karnataka (IN); Chethana Shivappa, Bangalore (IN); Ravi Murthy, Karnataka (IN)

(73) Assignee: GOODRICH CORPORATION, Charlotte, NC (US)

(*) Notice: Subject to any disclaimer, the term of this patent is extended or adjusted under 35 U.S.C. 154(b) by 269 days.

(21) Appl. No.: 16/223,161

(22) Filed: Dec. 18, 2018

(65) Prior Publication Data
US 2020/0094976 A1 Mar. 26, 2020

(30) Foreign Application Priority Data
Aug. 17, 2018 (IN) .............................. 201811030857

(51) Int. Cl.
*B64D 25/14* (2006.01)
*B60C 29/00* (2006.01)
*A62B 1/20* (2006.01)

(52) U.S. Cl.
CPC ................ *B64D 25/14* (2013.01); *A62B 1/20* (2013.01); *B63C 9/24* (2013.01); *F17C 2270/0189* (2013.01)

(58) Field of Classification Search
CPC .. B64D 25/14; A62B 1/20; B63C 9/24; F17C 2270/0189
See application file for complete search history.

(56) References Cited

U.S. PATENT DOCUMENTS

| | | | | |
|---|---|---|---|---|
| 3,191,596 A * | 6/1965 | Bird | ...................... | A61M 16/00 128/204.19 |
| 5,002,465 A * | 3/1991 | Lagen | ..................... | F04F 5/466 417/181 |
| 10,481,620 B2 * | 11/2019 | John | ..................... | F16K 17/403 |
| 2006/0232052 A1 * | 10/2006 | Breed | ................. | B60R 21/0132 280/735 |
| 2007/0228703 A1 * | 10/2007 | Breed | ................... | B60R 21/206 280/735 |
| 2008/0243342 A1 * | 10/2008 | Breed | ................... | B60R 21/232 701/45 |
| 2017/0136174 A1 * | 5/2017 | Levy | ................... | A61M 39/223 |
| 2020/0094976 A1 * | 3/2020 | John | ....................... | A62B 1/20 |

* cited by examiner

*Primary Examiner* — S. Joseph Morano
*Assistant Examiner* — Jovon E Hayes
(74) *Attorney, Agent, or Firm* — Cantor Colburn LLP

(57) ABSTRACT

An inflation control system includes a valve module and a controller. The valve module includes a first valve fluidly connected to a fluid source, a second valve fluidly connected to the first valve, and a pressure regulator fluidly connected to the second valve and an aspirator. The controller is in communication with the first valve.

17 Claims, 2 Drawing Sheets

INFLATION CONTROL SYSTEM

FOREIGN PRIORITY

This patent application claims priority to Indian Provisional Patent Application Serial No. 201811030857, filed Aug. 17, 2018, which is incorporated herein by reference in its entirety.

BACKGROUND

Pneumatic inflation systems discharge a high pressure stored gas to entrain air to inflate an inflatable device. The high pressure stored gas is to be discharged within a specified time by the opening an inflation valve. Pressure relief valves are provided with the inflatable device to release excess gas after the inflatable device achieves the desired inflation pressure.

SUMMARY

Disclosed is an inflation control system that includes a valve module and a controller. The valve module includes a first valve and a second valve. The first valve has a first valve inlet selectively connected to a fluid source and a first valve outlet. The second valve has a second valve first inlet connected to the first valve outlet, a second valve second inlet connected to the fluid source, and a second valve outlet fluidly connected to a fluid delivery device that is fluidly connected to an inflatable structure. The controller is in communication with the first valve.

Also disclosed is an inflation control system that includes a valve module and a controller. The valve module includes a first valve fluidly connected to a fluid source, a second valve fluidly connected to the first valve, and a pressure regulator fluidly connected to the second valve and an aspirator. The controller is in communication with the first valve.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
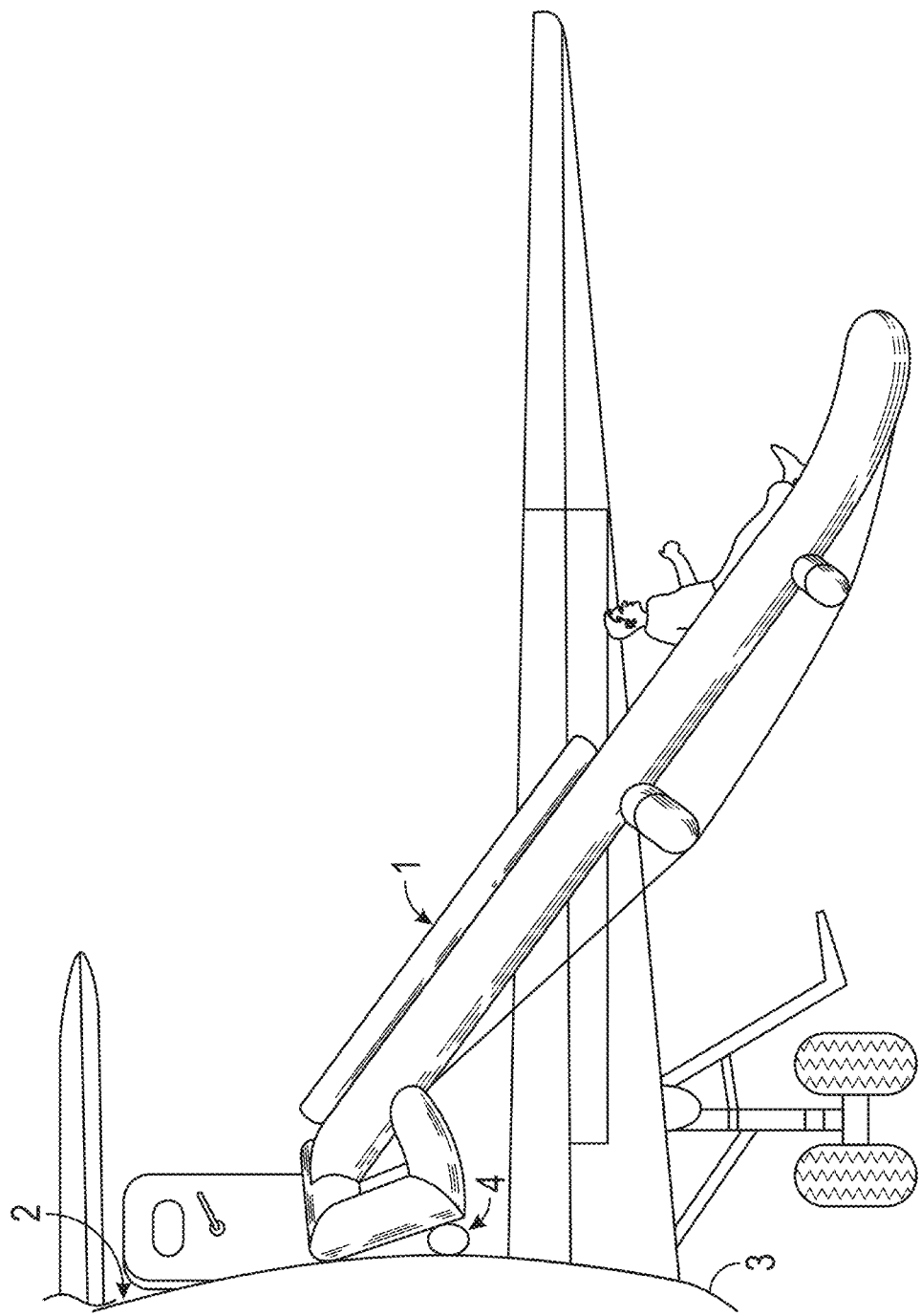
FIG. 1 is an illustration of an aircraft having an inflatable device in a deployed position.

Referring to FIG. 1, an inflatable structure or an inflatable device 1 may be provided with an aircraft 2. The inflatable device 1 may be an evacuation slide, raft, or the like. The evacuation slide may be implemented as an over the wing slide, a slide deployable away from the wing, or various other locations. The inflatable device 1 may be used for emergency evacuation of the aircraft 2 and is configured to be packaged within a compartment of the aircraft 2 (i.e. aircraft door, aircraft frame, a packboard housing inside the fuselage 3 of the aircraft 2, a slide bustle, etc.). An inflation system 4 is provided to rapidly inflate the inflatable device 1 from an un-deployed condition to a deployed condition, in which inflatable device 1 extends from the fuselage 3 of the aircraft 2 towards a supporting surface, as shown in FIG. 1. Responsive to a request to evacuate the aircraft 2 using the inflatable device 1, the inflation system 4 utilizes a source of pressurized gas or fluid such as a container or bottle of compressed gas that is suitably mounted on the underside of the inflatable device 1 that is connected to an aspirator, to rapidly inflate the inflatable device 1.

Commonly the inflatable device 1 is provided with a pressure relief valve that is arranged to avoid over inflation of the inflatable device 1 by the inflation system 3. The pressure relief valve may introduce inconvenience during handling and the packing because the pressure relief valve may result as a hard spot on the inflatable structure and the pressure relief valve joints with the inflatable structure are prone to exhibit leakage.

Figure 2:
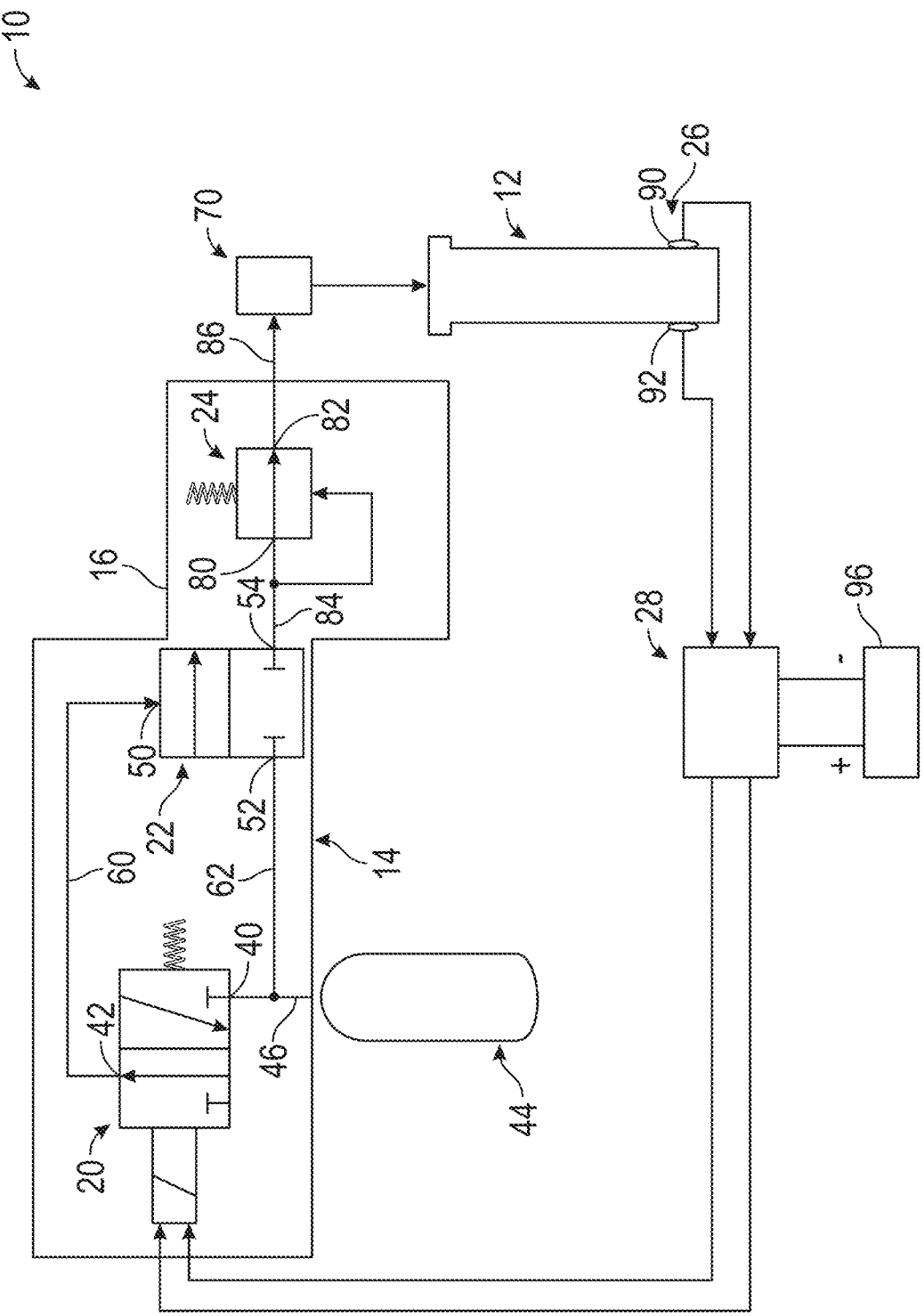
FIG. 2 is a schematic view of an inflation control system.

Referring to FIG. 2, the present disclosure provides an inflation control system 10 that incorporates pressure feedback and flow shutoff controls to avoid over inflation of the inflatable device or inflatable structure 12 without employing a pressure relief valve on the inflatable device 1. The inflation control system 10 includes valve module 14 disposed within a valve housing 16. The valve module 14 having a first valve 20, a second valve 22, and a pressure regulator 24. The inflation control system further includes a sensor assembly 26 and a controller 28.

The first valve 20 is arranged as a pilot valve having a first valve inlet 40 and a first valve outlet 42. The first valve inlet 40 is fluidly connected to a fluid source 44 such as a pressurized fluid source through a first conduit 46 that extends between the first valve inlet 40 and the fluid source 44. The first valve 20 is arranged as an electrically actuated valve having a movable member that is arranged to move between a first position (e.g. closed position) that inhibits a fluid flow through the first valve inlet 40 to the first valve outlet 42 and a second position (e.g. open position) that facilitates a fluid flow through the first valve inlet 40 to the first valve outlet 42. In the embodiment shown, the first valve 20 is illustrated as a three way, two port pilot solenoid valve that is arranged to move between the first position and the second position responsive to signals or commands provided by the controller 28 or manual actuation.

The second valve 22 is fluidly connected to the first valve 20. The second valve 22 is arranged as a pneumatic valve having a second valve first inlet 50, a second valve second inlet 52, and a second valve outlet 54.

The second valve first inlet 50 is fluidly connected to the first valve outlet 42 through a second conduit 60 that extends between the first valve outlet 42 and the second valve first inlet 50. The second valve second inlet 52 is fluidly connected to the fluid source 44 through a bypass line 62 that extends between the first conduit 46 and the second valve second inlet 52.

The second valve 22 has a movable member, such as a poppet, that is arranged to move between a first position (e.g. closed position) that inhibits a fluid flow through at least one of the second valve first inlet 50 and the second valve second inlet 52 and a second position (e.g. open position) that facilitates a fluid flow through at least one of the second valve first inlet 50 and the second valve second inlet 52, responsive to the first valve 20 providing a fluid flow to the second valve 22. In at least one embodiment, the second valve 22 is movable between the first position and the second position responsive to signals or commands provided by the controller 28.

The pressure regulator 24 is fluidly connected to the second valve 22 and a fluid delivery device 70. The pressure regulator 24 is arranged as a pressure regulator having a regulator inlet or a third inlet 80 and a regulator outlet or a third outlet 82. The third inlet 80 is fluidly connected to the second valve outlet 54 through a third conduit 84 that extends between the third inlet 80 and the second valve outlet 54. The third outlet 82 is fluidly connected to the fluid delivery device 70 through a fourth conduit 86 that extends between the third outlet 82 and the fluid delivery device 70.

The pressure regulator 24 is a variable flow area device having a regulator flow area that varies as an inlet pressure at the third inlet 80, varies. For example, the regulator flow area may increase with the decrease in the inlet pressure at the third inlet 80 or may decrease with an increase in the inlet pressure at the third inlet 80 to regulate a fluid flow delivered to the fluid delivery device 70.

The fluid delivery device 70 is an aspirator that is arranged to entrain a secondary fluid flow, such as ambient air, with a fluid flow that is delivered to the fluid delivery device 70 via the second valve 22 to inflate the inflatable structure 12 to a desired inflation pressure.

The sensor assembly 26 includes a pressure sensor 90 and a temperature sensor 92. The pressure sensor 90 is disposed on the inflatable structure 12 and is arranged to provide a pressure signal indicative of the pressure within the inflatable structure 12 to the controller 28. The pressure sensor 90 may be a MEMS-type sensor. The temperature sensor 92 is disposed on the inflatable structure 12 and is arranged to provide a temperature signal indicative of the temperature within or proximate the inflatable structure 12 to the controller 28. The temperature sensor 92 may be a MEMS-type sensor.

In at least one embodiment, the inflatable structure 12 may be provided with a plurality of pressure sensors and a plurality of temperature sensors. The plurality of pressure sensors and temperature sensors provides measurement redundancies through additional sensors. The additional sensors provide improved pressure and temperature indication within the inflatable structure 12.

The pressure sensor 90 and the temperature sensor 92 of the sensor assembly 26 are inhibited from providing their respective signals prior to at least one of a fluid flow being delivered to the first valve 20 or a command to open the first valve 20 is provided by the controller 28.

The controller 28 is in communication with the first valve 20, the pressure sensor 90, the temperature sensor 92, and in some embodiments, the second valve 22. The controller 28 may be provided power from an independent power source 96. The controller 28 may be preprogrammed with the desired inflation pressure. The desired inflation pressure may be at least partially based on the temperature signal such that the desired inflation pressure may be adjusted based on the temperature proximate or within the inflatable structure 12.

The controller 28 is provided with input communication channels that are arranged to receive: 1) the pressure signal indicative of the pressure within the inflatable structure 12 from the pressure sensor 90 and 2) the temperature signal indicative of the temperature within or proximate the inflatable structure 12 from the temperature sensor 92.

The controller 28 is provided with output communication channels that are arranged to provide signals or commands to: 1) the first valve 20 and/or 2) the second valve 22.

The controller 28 is provided with at least one processor that is programmed to perform control logic, control algorithms, or functions to command the first valve 20 and/or the second valve 22 to perform various functions.

The first valve 20 may be commanded to move from the first position to the second position (e.g. the closed position to the open position) manually by an operator to inflate the inflatable structure 12 or by a signal provided by the controller 28 to open the first valve 20. Responsive to the first valve 20 moving from the closed position towards the open position, the pressure sensor 90 and the temperature sensor 92 are arranged to provide the pressure signal and the temperature signal, respectively, to the controller 28. In at least one embodiment, responsive to the first valve 20 moving from the closed position to the open position, the controller 28 requests that the pressure sensor 90 and the temperature sensor 92 provide the pressure signal and the temperature signal to the controller 28.

Responsive to the first valve 20 moving from the closed position to the open position, the fluid source 44 provides a fluid flow to the first valve 20 through the first valve inlet 40 that is discharged through the first valve 20 through the first valve outlet 42 and is delivered to the second valve 22. The fluid flow that is received through the second valve first inlet 50 may move the second valve 22 from the closed position towards the open position. The fluid flow may flow through the second valve 22 and is discharged through the second valve outlet 54 to the pressure regulator 24. The fluid flow that is received through the third inlet 80 may flow through the pressure regulator 24 and is discharged through the third outlet 82 and delivered to the fluid delivery device 70 to inflate inflatable structure 12.

The controller 28 continues to monitor pressure within the inflatable structure 12 by receiving the pressure signal from the pressure sensor 90. The pressure sensor 90 provides pressure feedback as to the pressure within the inflatable structure 12 to the controller 28. The temperature sensor 92 also provides temperature feedback to the controller 28 to allow the controller 28 to adjust the desired inflation pressure based on the temperature. The desired inflation pressure may be set to any value that may be registered to the controller 28. The desired inflation pressure may be controlled by the opening duration of the second valve 22.

Responsive to the pressure within the inflatable structure 12 achieving the desired inflation pressure, the controller 28 is programmed to command the first valve 20 to move towards the closed position. Responsive to the first valve 20 moving towards the closed position, the second valve 22 may move towards the closed position due to the reduction in a flow rate of the fluid flow or the controller 28 may command the second valve 22 to move towards the closed position.

The arrangement of the inflation control system 10 of the present disclosure does not require the use of a pressure relief valve with the valve module 14 or the inflatable structure 12. Furthermore, since the inflation control system 10 includes inflation flow shutdown, the chances of a pressure rise within the inflatable structure 12 due to an excess inflow of gas into the inflatable structure 12 may be inhibited. The incorporation of pressure and temperature feedback during deployment or inflation of the inflatable structure 12 via a sensor assembly 26 associated with the inflatable structure 12 enables the inflation control system 10 to have more control over the inflation process of the inflatable structure 12 to inhibit over inflation or under inflation of the inflatable structure 12.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described. Additionally, while various embodiments of the present disclosure have been described, it is to be understood that aspects of the present disclosure may include only some of the described embodiments. Accordingly, the present disclosure is not to be seen as limited by the foregoing description.

What is claimed is:

1. An inflation control system, comprising:
   a valve module, comprising:
      a first valve having a first valve inlet selectively connected to a fluid source and a first valve outlet, and
      a second valve having a second valve first inlet connected to the first valve outlet, a second valve second inlet connected to the fluid source, and a second valve outlet fluidly connected to a fluid delivery device that is fluidly connected to an inflatable structure; and
   a controller in communication with the first valve.

2. The inflation control system of claim 1, further comprising:
   a pressure sensor arranged to provide a pressure signal indicative of a pressure within the inflatable structure to the controller.

3. The inflation control system of claim 2, further comprising:
   a pressure regulator having a third inlet connected to the second valve outlet and a third outlet connected to the fluid delivery device.

4. The inflation control system of claim 3, wherein responsive to a command from the controller to open the first valve, the fluid source provides a fluid flow to the first valve inlet that is delivered through the first valve outlet and is received by the second valve through the second valve inlet to move the second valve from a closed position towards an open position.

5. The inflation control system of claim 4, wherein the fluid flow is discharged through the second valve outlet through the third inlet and the third outlet to the fluid delivery device.

6. The inflation control system of claim 5, wherein responsive to the pressure within the inflatable structure achieving a desired inflation pressure, the controller is programmed to command the first valve to move towards a closed position.

7. The inflation control system of claim 5, wherein responsive to the first valve moving towards the closed position, the second valve moves towards a closed position.

8. An inflation control system, comprising:
   a valve module, comprising:
      a first valve fluidly connected to a fluid source,
      a second valve fluidly connected to the first valve, and
      a pressure regulator fluidly connected to the second valve and an aspirator; and
   a controller in communication with the first valve.

9. The inflation control system of claim 8, further comprising:
   a pressure sensor disposed on an inflatable structure, the pressure sensor being arranged to provide a pressure signal indicative of a pressure within the inflatable structure to the controller.

10. The inflation control system of claim 9, further comprising:
    a temperature sensor disposed on the inflatable structure, the temperature sensor being arranged to provide a temperature signal indicative of a temperature within the inflatable structure to the controller.

11. The inflation control system of claim 10, wherein responsive to a command from the controller to open the first valve, the fluid source provides a fluid flow to the first valve that is delivered to the second valve and delivered through the pressure regulator to the aspirator.

12. The inflation control system of claim 11, wherein responsive to the pressure within the inflatable structure achieving a desired inflation pressure, the controller is programmed to command the first valve to move towards a closed position.

13. The inflation control system of claim 12, wherein the desired inflation pressure is at least partially based on the temperature signal.

14. The inflation control system of claim 12, wherein responsive to the first valve moving towards the closed position, the second valve moves towards the closed position.

15. The inflation control system of claim 11, wherein prior to the first valve opening, the pressure sensor is inhibited from providing the pressure signal and the temperature sensor is inhibited from providing the temperature signal.

16. The inflation control system of claim 11, wherein responsive to the first valve opening, the pressure sensor is arranged to provide the pressure signal and the temperature sensor is arranged to provide the temperature signal.

17. The inflation control system of claim 10, wherein the inflatable structure includes a plurality of temperature sensors and a plurality of pressure sensors.

* * * * *